(12) United States Patent
Elteto

(10) Patent No.: US 8,307,169 B2
(45) Date of Patent: Nov. 6, 2012

(54) PROTECTING GUEST VIRTUAL MACHINE MEMORY

(75) Inventor: Laszlo Elteto, Irvine, CA (US)

(73) Assignee: SafeNet, Inc., Belcamp, MD (US)

(*) Notice: Subject to any disclaimer, the term of this patent is extended or adjusted under 35 U.S.C. 154(b) by 13 days.

(21) Appl. No.: 13/045,232

(22) Filed: Mar. 10, 2011

(65) Prior Publication Data

US 2012/0233378 A1    Sep. 13, 2012

(51) Int. Cl.
*G06F 12/00* (2006.01)
(52) U.S. Cl. ............ 711/152; 711/6; 711/163; 711/203; 711/209
(58) Field of Classification Search .................. None
See application file for complete search history.

(56) References Cited

U.S. PATENT DOCUMENTS

2010/0031360 A1* 2/2010 Seshadri et al. ............... 726/24

OTHER PUBLICATIONS

A. Baliga, X. Chen, and L. Iftode. Paladin: Automated detection and containment of rootkit attacks. Department of Computer Science, Rutgers University, Apr. 2006.
J. Rhee, R. Riley, D. Xu, and X. Jiang. Defeating Dynamic Data Kernel Rootkit Attacks via VMM-based Guest-Transparent Monitoring. In Proceedings of ARES 2009 Conference, 2009.
A. Seshadri, M. Luk, N. Qu, and A. Perrig. SecVisor: a tiny hypervisor to provide lifetime kernel code integrity for commodity OSes. In SOSP '07: Proceedings of twenty-first ACM SIGOPS symposium on Operating systems principles, pp. 335-350, New York, NY, USA, 2007.
L. Litty. Architectural Introspection and Applications. PhD Thesis, University of Toronto Graduate Department of Computer Science, 2010.

* cited by examiner

*Primary Examiner* — Shawn X Gu
(74) *Attorney, Agent, or Firm* — Drinker Biddle & Reath LLP

(57) ABSTRACT

A hypervisor runs on a host computer system and defines at least one virtual machine. An address space of the virtual machine resides on physical memory of the host computer system under control of the hypervisor. A guest operating system runs in the virtual machine. At least one of a host operating system and the hypervisor sets parts of the address space of the host computer system corresponding to parts of the address space of the virtual machine to a locked state in which those parts can be read but not written to.

14 Claims, 4 Drawing Sheets

PROTECTING GUEST VIRTUAL MACHINE MEMORY

BACKGROUND OF THE INVENTION

It is possible for processes on a computer to run in a "virtual machine" (VM) which is a region within a host computer that appears to the processes within it to be a self-sufficient computer, but is in fact a smaller region running as a guest under the control of a "hypervisor" running in another part of the host computer. The hypervisor is responsible for providing physical resources in the real machine that correspond to the apparent resources in the virtual machine. In some cases, a guest virtual machine may run within a host virtual machine that itself runs on a physical computer.

Such an arrangement may be used, for example, for security or resource management, to restrict processes within the virtual machine from interfering with other parts of the host computer, or for practical reasons, for example, where an application needs, and a virtual machine provides, a guest operating system (OS) different from the native operating system of the host machine.

In general, the hypervisor may take various forms, including, without limitation, a "bare metal" hypervisor, a hypervisor embedded or incorporated in an operating system of the host computer, or one or more hypervisors running in application space under the operating system of the host computer. The "bare metal" hypervisor typically includes as much of an operating system as it needs, but does not support application processes except within its virtual machine. Other configurations with an integrated or separate host operating system and hypervisor may, but do not need to, support application processes in the host operating system's space. Even where the host operating system and hypervisor are not fully integrated, the distribution of functionality between them may vary.

The Trusted Computing Group (TCG) proposes using a hardware device in the host computer, the Trusted Platform Module (TPM) chip, that can verify a signature and prevent code that is not trusted, or that has been improperly modified, from being loaded. That supervision can include verifying both the host computer's own code and the operating system and application code that is to be run within a guest virtual machine.

However, that approach does not prevent modification of the code within the virtual machine after it has been loaded, and if a hacker or a malicious or defective program is able to gain privileged status it can modify other code at least up to the level of the operating system of the virtual machine. The TPM will detect when improperly modified code is reloaded, but that may not be until next time the virtual machine is rebooted, which for a continuously operating system may not be for weeks or even longer. If a hacker is sufficiently cautious not to leave permanent modifications, the TPM may have nothing to detect. That may occur if the hacker considers it more important to cover his tracks than to make subsequent intrusions easier: he may assume that if his intrusion is not detected he will be able to re-enter the system in the same way on future occasions. Also, some hackers may not wish to re-visit the same computer, and therefore may have no need to make lasting changes to the code.

In most modern operating systems, memory pages occupied by program code (both operating system and application code) are set to read/execute only. However, a hacker or malicious program with privileged status could of course reset that status to allow the code to be modified.

SUMMARY OF THE INVENTION

According to one embodiment of the present systems, methods, and programs, memory pages containing operating system or program code of a guest virtual machine are identified at a host or hypervisor level or other level outside the guest virtual machine. Such pages are then set to read/execute only status outside the guest virtual machine.

Setting the read/execute only status outside the guest virtual machine can obstruct a hacker or malicious program with privileged status within the guest virtual machine from modifying the program code on those pages. That does not absolutely prevent improper modification of the program code within the guest virtual machine, but it makes such modification far more difficult, because the hacker must escape from the guest virtual machine to the level at which the memory pages are protected. In a complex system, there may be two or more levels of abstraction between the memory hardware and the guest virtual machine, and the read/execute only protection could then be set at any one, two, or more of those levels, for the convenience of the system operator or the further frustration of the hacker.

Other aspects of the invention include methods, computers and computer systems, computer programs, and non-transitory computer-readable storage media containing computer programs.

BRIEF DESCRIPTION OF THE DRAWINGS

The above and other aspects, features, and advantages of the present invention may be more apparent from the following more particular description of embodiments thereof, presented in conjunction with the following drawings. In the drawings.

DETAILED DESCRIPTION OF THE PREFERRED EMBODIMENTS

A better understanding of various features and advantages of the present methods and devices may be obtained by reference to the following detailed description of illustrative embodiments of the invention and accompanying drawings. Although these drawings depict embodiments of the contemplated methods and devices, they should not be construed as foreclosing alternative or equivalent embodiments apparent to those of ordinary skill in the subject art.

Figure 1:
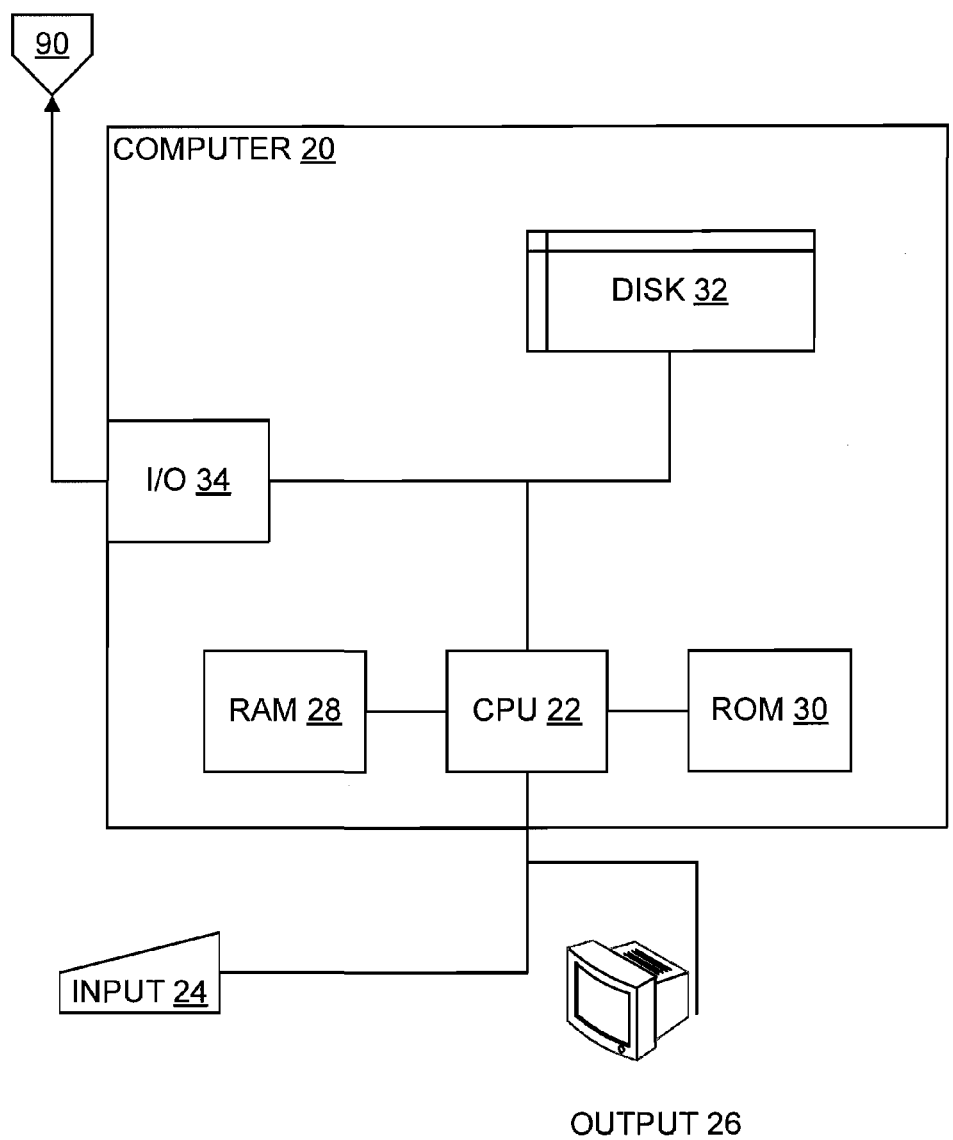
FIG. 1 is a schematic diagram of an embodiment of a computer system.

Referring to the drawings, and initially to FIG. 1, an example of a computer apparatus indicated generally by the reference number 20 comprises, among other equipment, a processor 22, input and output devices 24, 26, random access memory (RAM) 28, read-only memory (ROM) 30, magnetic disks or other long-term storage 32, and an interface 34 to an external network or other communications media.

Figure 2:
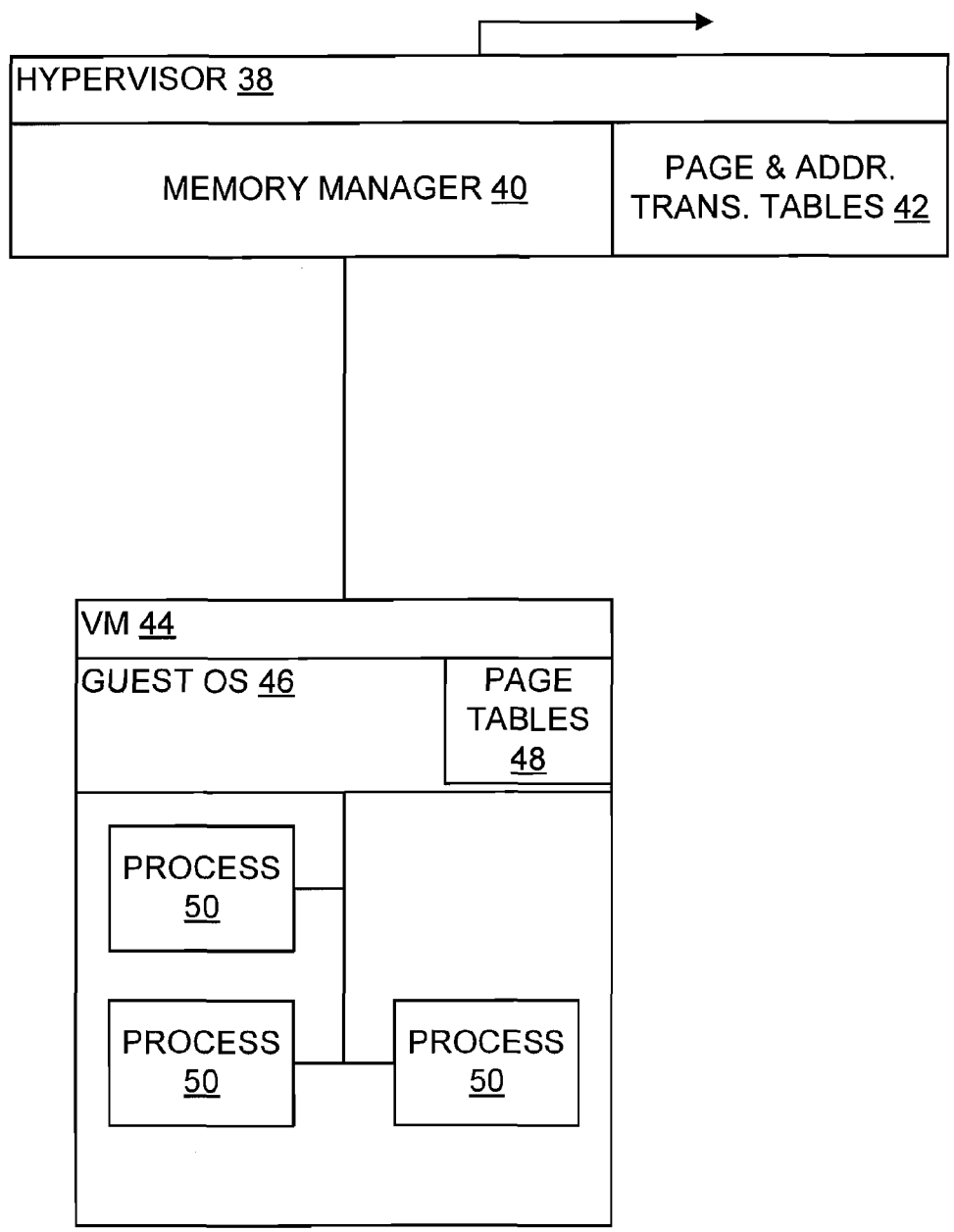
FIG. 2 is a functional block diagram of an embodiment of a computer system.

Referring now also to FIG. 2, in one example of operation of the computer 20, a hypervisor 38 runs on processor 22 of computer 20. Hypervisor 38 may be a "bare metal" hypervisor that runs on the hardware of computer 20 without an intervening operating system (OS), and in effect includes its own minimal operating system. In this embodiment, the "bare metal" hypervisor then acts purely to create a virtual machine (VM) 44 with an environment different from the native environment of computer 20. Hypervisor 38 includes a memory manager 40 with page and address translation tables 42 that track which process (including the hypervisor 38 itself) is permitted to use each part of RAM 28 and long-term storage 32. The page tables 42 also match memory addresses in the address space of virtual machine 44 to machine addresses of the memory hardware.

The hypervisor 38 controls a region of the address space of computer 20 within which the hypervisor 38 can assign space to virtual machine 44. Virtual machine 44 has a "guest" operating system 46 running within an address space local to the virtual machine 44. One or more applications or other processes 50 run on the virtual machine 44 under the guest operating system 46. The processes 50 are allowed access to memory within the address space of the virtual machine 44 through page tables 48 controlled by the guest operating system 46. The processes 50 are allowed access to physical resources of computer 20, such as input and output devices 24, 26 and external interface 34, under control of the hypervisor 38. However, except as permitted by hypervisor 38, resources and activities outside virtual machine 44 are invisible to processes 50 within virtual machine 44.

Figure 3:
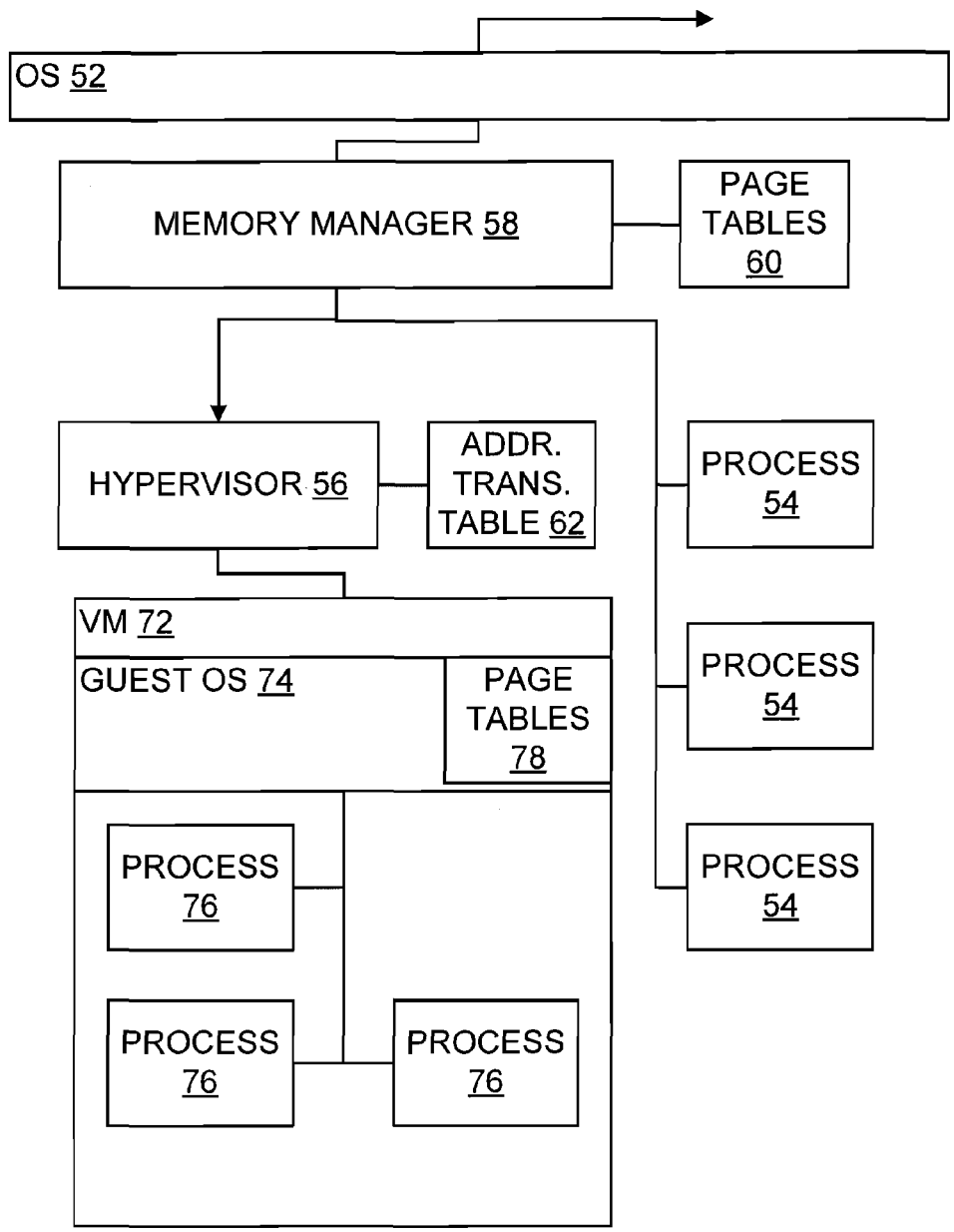
FIG. 3 is a functional block diagram of an embodiment of a computer system.

Referring now also to FIG. 3, in another example of operation of the computer 20, an operating system (OS) 52 runs on the processor 22 of computer 20. Various application programs and other processes 54, including a hypervisor 56, run under operating system 52. The operating system 52 includes a memory manager 58 with page tables 60 that track which application or other process 54 is permitted to use each part of RAM 28 and long-term storage 32. The page tables 60 may also match memory addresses used by processes 54 to machine addresses of the memory hardware, enabling processes 54 to run without being configured for the specific hardware resources of computer 20.

The hypervisor 56 controls a region of the address space of operating system 52 within which the hypervisor 56 can assign space to one or more virtual machines 72. Each virtual machine (VM) 72 has a "guest" operating system 74 running within an address space local to the virtual machine 72. The hypervisor 56 maintains an address translation table 62 by which addresses in the address space of the virtual machine 72 are mapped to addresses in the address space of the "host" operating system 52. One or more applications or other processes 76 run on the virtual machine 72 under the guest operating system 74. The processes 76 are allowed access to memory within the address space of the virtual machine 72 through page tables 78 controlled by the guest operating system 74. The processes 76 are allowed access to physical resources of computer 20, such as input and output devices 24, 26 and external interface 34, under control of the hypervisor 56. However, except as permitted by hypervisor 56, resources and activities outside virtual machine 72 are invisible to processes 76 within virtual machine 72.

Page tables and address translation tables typically record attributes of the memory pages to which they relate, including specifying the extent to which the contents of the page can be altered. One common attribute value is "read/execute only," under which the operating system will permit unprivileged applications to read data on that page, including permitting program code on that page to execute without privilege, but will not permit that page to be altered. The page table itself is protected so that it cannot be edited by an unprivileged process or user.

In order to prevent undesired changes to program code, including its own code, the guest operating system 46 or 74 may assign a "read/execute only" attribute value in page table 48 or 78 to those pages containing the code to be protected, as soon as the relevant code has been loaded to those pages at startup. However, if a hacker or malicious or defective code can obtain privileged status within virtual machine 44 or 72, he or it may then be able to alter the page table attribute values, and allow himself or itself to alter code that should not be altered.

Figure 4:
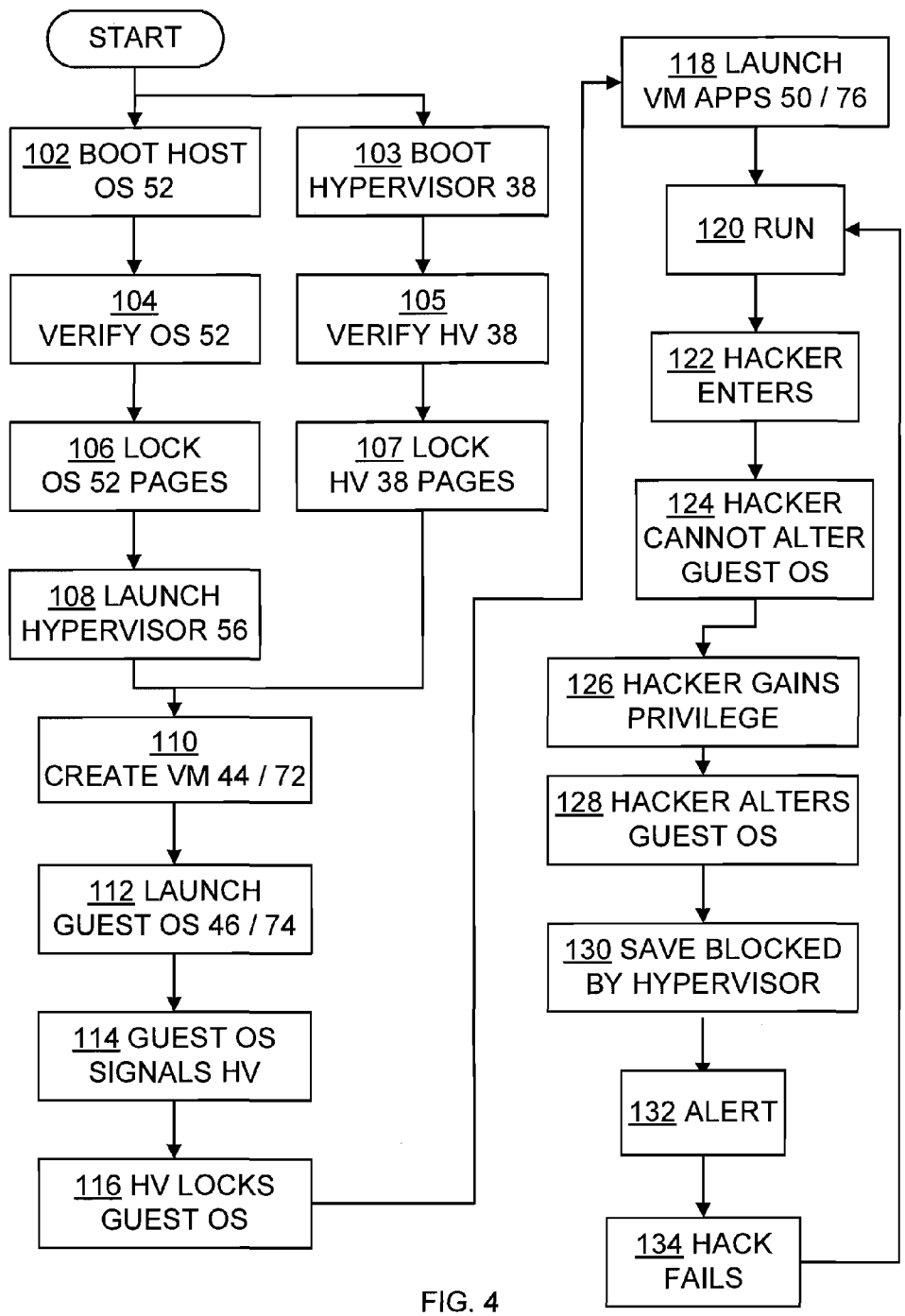
FIG. 4 is a flow-chart.

Referring now to FIG. 4, when computer 20 is started up in the configuration shown in FIG. 3, in step 102, host operating system 52 boots. In step 104, the integrity of host operating system 52 is assured, for example, by launching it from secure memory, or by a secure hardware device, for example, a Trusted Platform Module chip, verifying a hash or digital signature of the operating system program. Operating system 52 may be verified either by examining the program on disk storage 32 immediately before it is launched, or by examining the image in RAM immediately after it is launched and before control of processor 22 is transferred to operating system 52. In the interests of simplicity, step 104 is shown after step 102. In step 106, the entries in page table 60 for pages containing the operating system 52 are set to read/execute only. It will be understood that in a real computer system the operating system 52 will typically consist of more than a single executable program, and steps 102, 104, and 106 may need to be carried out repeatedly, in series, in parallel, or overlapping, for different parts of operating system 52. Devising an appropriate sequence is within the ordinary skill in the art, and the appropriate sequence will vary depending on the computer hardware and operating system involved. In the interests of conciseness, therefore, the repetition is not described in further detail.

Only after the operating system 52 is launched and secured are hypervisor 56 and other processes 54 launched in step 108. Because applications 54 may be less trusted than operating system 52, they are launched only after operating system 52 has been protected. Because applications 54 are launched only after operating system 52 has been protected, they do not need to be as trusted as operating system 52. Preferably, step 108 includes steps of verifying, launching, and securing applications 54 similar to steps 102, 104, and 106. In particular, in this embodiment hypervisor 56 is fully verified and protected, because malicious interference with hypervisor 56 could jeopardize the integrity of virtual machine 72.

In the configuration shown in FIG. 2, the hypervisor 38 and the host operating system are not distinct components, and in step 103, the hypervisor 38 is booted. As mentioned above, this may be a "bare metal" hypervisor that is its own operating system. Then, the hypervisor 38 is verified in step 105, and locks its own memory pages in step 107, and there is no distinct step 108 of launching the hypervisor.

In step 110, hypervisor 38 or 56 creates virtual machine 44 or 72. In step 112, guest operating system 46 or 74 is launched, verified, and secured similarly to steps 102, 104, and 106. Even if the verification of guest operating system 46 or 74 is effected by examining the RAM image after loading, that examination desirably takes place in the host machine. However, if both the host operating system 52 or hypervisor 38 and the guest operating system 46 or 74 support verification by hardware, such as the Trusted Platform Module chip, then the Trusted Platform Module chip may be configured to report its verification to both operating systems. As described above for host operating system 52, guest operating system 46 or 74 is secured by setting its memory pages to read/execute only in its own page table 48 or 78. However, because guest operating system 46 or 74 is in a virtual machine 44 or 72, its page table 48 or 78 relates to virtual memory pages, which are mapped through host page and address translation tables, such as tables 42 in FIG. 2, or in FIG. 3 are mapped through address translation table 62 to page table 60, and through page table 60 to actual machine memory hardware.

In step 114, guest operating system 46 or 74 signals to hypervisor 38 or 56 that specified pages in virtual machine address space are loaded and locked. In the present embodiments, the signal includes the locations, in the address space of virtual machine 44 or 72, of the pages to be locked. If the particular guest operating system 46 or 74 is well understood, has a very predictable loading procedure, and does not change, then it may be possible to agree in advance what range of the address space of virtual machine 44 or 72 that operating system will occupy, and it may then not be necessary for the signal to specify the pages to be locked. Where guest operating system 46 or 74 is based on a generally available operating system, the code that sends that signal to hypervisor 38 or 56 may be the only part of guest operating system 46 or 74 that is modified in order to implement the present method. As far as possible, page table 48 or 78 is locked and this signal is sent before control of the virtual machine 44 or 72 is transferred to the parts of guest operating system 46 or 74 that are in the pages being locked. The parts of guest operating system 46 or 74 responsible may therefore in some operating systems be part of a bootstrap loader, rather than part of the main code of guest operating system 46 or 74. Where guest operating system 46 or 74 supports the Trusted Platform Module chip or other provision for verifying code when it is loaded, the signaler may be associated with that provision, so as to signal the hypervisor 38 or 56 as an addition to the normal process of approving the code as verified. The best place to put this code will be largely determined by the design and behavior of the particular operating system used as guest operating system 46 or 74.

In step 116, hypervisor 56 sets address translation table 62, and/or host operating system 52 or hypervisor 56 sets page table 60, or hypervisor 38 sets page table 42, to lock the specified pages containing guest operating system 46 or 74 to be read/execute only. The code that receives that signal from guest operating system 46 or 74 may be the only part of hypervisor 38 or 56 that is modified in order to implement the present method.

Where the host operating system 52 or hypervisor 38 supports page swapping that is transparent to virtual machine 44 or 72, it may be necessary to swap pages that are "locked" at page table 42 or 60 or address translation table 62. In that case, pages that are swapped out may simply be dropped, because they should not have been modified in any way, and pages that are swapped in are permitted to be loaded only from specified locations in ROM 30 or long-term storage 32 that are protected against alteration. Then, even if a locked page does somehow become altered, the alterations may be canceled as a result of normal page swapping. In a typical configuration, the location of the locked pages in the address space of virtual machine 44 or 72 does not change, so the pages in question can easily be tracked on the virtual machine's side of page and address translation table 42 or address translation table 62. However, if locked pages are tracked on the host machine's side of table 42 or 62, for example, in page tables 60, then attributes indicating which pages are locked may need to be updated dynamically as page translation assignments change.

Only after guest operating system 46 or 74 is fully secured, in step 118 applications 50 or 76 are launched within guest operating system 46 or 74. As discussed above for applications 54, because applications 50 or 76 may be less trusted than operating system 46 or 74, they are launched only after operating system 46 or 74 has been protected. Because applications 50 or 76 are launched only after operating system 46 or 74 has been protected, they do not need to be as trusted as operating system 46 or 74. Preferably, step 118 includes steps of verifying, launching, and securing applications 50 or 76 similar to steps 112, 114, and 116.

In step 120, applications 50 or 76 run, and carry out whatever useful purpose they were intended to serve.

In step 122, a hacker 90 (see FIG. 1) gains access to virtual machine 44 or 72 through external interface 34, and in step 124 the hacker alters, or attempts to alter, guest operating system 46 or 74 or application 50 or 76 to serve some nefarious purpose. Because page table 48 or 78 defines pages containing guest operating system 46 or 74 and application 50 or 76 as read/execute only, the hacker 90 is unable to do so.

In step 126, the hacker secures a privilege level within virtual machine 44 or 72 that enables him to override the protection on page table 48 or 78, and grants himself the right to edit memory pages containing guest operating system 46 or 74 or application 50 or 76. In step 128, the hacker attempts to edit such pages. However, in step 130 the edit fails because the pages in question are still defined as read/execute only in page table 60, or address translation table 62, or both, or in page and address translation table 42. If hacker 90 does not realize he is in a virtual machine, this failure may be baffling. Even if hacker 90 does realize he is in a virtual machine, he is then faced with the task of breaking out of the virtual machine 44 or 72 in order to edit the page table 42 or 60 of the host machine.

In normal operation, step 130 should never occur, because any write that is blocked at step 130 should already have been blocked at step 124. If memory manager 40 or 58, or hypervisor 56, can identify at step 130 a write attempt that should have been blocked at step 124, that may be a strong indication that something untoward has happened, for example, that the protection on page tables 48 or 78 has failed or has been hacked, or that a malfunctioning process in the host system is making memory accesses that it should not be making.

Where pages are locked in a dedicated address translation table 62, the only locked pages should be those that were signaled in step 114, and those pages should all be locked in guest page table 48 or 78. In that situation, any attempt to write to a locked page is suspicious. Where pages are locked in page table 42 or 60, that page table may also be locking pages of host operating system 52, hypervisor 38 or 56, and/or host applications 54. However, locked virtual machine pages may be identified either by setting an explicit attribute in page table 42 or 60, or by matching the pages against a range of address space that is known to be assigned to a virtual machine. In any of those embodiments, when an improper write attempt is blocked in step 130, the improper write attempt is identified as such, and in step 132 an appropriate alert may be generated. For example, the infraction may be logged for later diagnostic use, a message may be displayed on a console or otherwise sent to a human administrator, or other precautionary measures may be activated as is known to those skilled in the art.

In step 134, the hack fails, and the computer 20 returns to step 120 and continues to operate normally.

Although specific embodiments have been described, various modifications are possible without departing from the spirit of the invention or the scope of the appended claims, and features of the different embodiments may be combined into one embodiment.

For example, in the interests of simplicity, a computer 20 with a single processor 22 has been described. In practice, computer 20 may have multiple processors, and may be a network or other structure of multiple computers. A single virtual machine 72 running under a single host operating system 52 has been described, but in practice, a more complex structure, including structures with multiple virtual machines under one hypervisor, and/or multiple hypervisors, and/or guest virtual machines running within host virtual machines running under a native operating system of a physical computer, are possible.

An embodiment with a bare metal hypervisor 38 and an embodiment with the host operating system 52 and the hypervisor 56 as separate programs, with the hypervisor 56 running in application space under the host operating system 52, have been described. In a further embodiment, the hypervisor 56 is integrated with the host operating system 52, but the host operating system 52 is a full operating system supporting host level processes 54 and/or multiple hypervisors 56.

The identity of the human administrator responsible for choosing the configuration of the system has not been addressed, and will vary from system to system. However, in a large system the virtual machine 72 may have a "virtual" administrator different from the administrator of the host computer 20. It may therefore be desirable for the guest operating system 74 to be able to issue signals in step 114, and for the hypervisor 56 to be able to act on those signals, without other communication between the virtual machine and host computer realms, either at the time when the signal is issued or in advance.

Although in the embodiment the virtual machine 72 is described as being protected against a direct attack from outside by a hacker, it will be seen by the skilled reader that the systems and methods described can also provide useful protection against disruption arising within the virtual machine 72, for example, caused by buggy code or by malicious code introduced in a latent form at an earlier time.

It would be possible to lock address pages at the page table 60 or the address translation table 62 without also locking the pages at the guest page table 78. However, that creates the risk that the guest operating system 74 might in good faith authorize a change to a locked page, creating an error that could not be resolved within the virtual machine 72. It is therefore recommended that all pages locked at the host level should also be locked within the virtual machine 72.

Accordingly, reference should be made to the appended claims, rather than to the foregoing specification, as indicating the scope of the invention.

The invention claimed is:

1. A host computer system comprising a processor and program code operative on said processor, said program code comprising program code of:
   a hypervisor defining at least one virtual machine, wherein an address space of said at least one virtual machine resides on physical memory of said host computer system under control of said hypervisor; and
   a guest operating system of said at least one virtual machine;
   wherein at least one of said hypervisor and a host operating system of said host computer system is operative to set parts of an address space of said host computer system corresponding to part of the address space of said at least one virtual machine to a locked state in which said parts of the address space of said host computer system can be read but not written to;
   wherein said guest operating system comprises a component operative to signal to said hypervisor after other components of said guest operating system or of a program running under said guest operating system are loaded into working memory of said at least one virtual machine and before said other components start running, and wherein said hypervisor is responsive to said signaling to set to said locked state parts of the address space of said host computer system containing program code of said other components.

2. A host computer system according to claim 1, wherein said parts of the address space of said at least one virtual machine comprise space occupied by program code of said guest operating system or by program code of an application running under said guest operating system.

3. A host computer system according to claim 1, wherein said hypervisor or host operating system permits pages of said address space of said at least one virtual machine to be paged in and paged out, and wherein, when a page in said locked state is paged in, said page is permitted to be loaded only from a specified storage location that is protected against alteration.

4. A host computer system according to claim 1, further operative to verify outside the at least one virtual machine integrity of program code when such code is loaded into the at least one virtual machine.

5. A method of protecting a computer system, comprising:
   running a hypervisor on said computer system, said hypervisor defining at least one virtual machine, wherein an address space of said at least one virtual machine resides on physical memory of said computer system under control of said hypervisor;
   running a guest operating system on said at least one virtual machine; and
   setting parts of an address space of said computer system corresponding to parts of the address space of said at least one virtual machine to a locked state in which they can be read but not written to;
   further comprising said guest operating system signaling to said hypervisor after other components of said guest operating system or of a program running under said guest operating system are loaded into working memory of said at least one virtual machine and before said other components start running, and said hypervisor in response to said signaling setting to said locked state parts of the address space of said computer system containing program code of said other components.

6. The method of claim 5, wherein said parts of the address space of said at least one virtual machine are occupied by said guest operating system or by an application running under said guest operating system.

7. The method of claim 5, further comprising setting said parts of the address space of said at least one virtual machine to a locked state, in which they can be read but not written to, within the at least one virtual machine.

8. The method of claim 7, further comprising identifying in the computer system locked address space that corresponds to locked address space within said at least one virtual machine, and generating a response when a request is received in the host computer system to write to said identified locked address space.

9. The method of claim 5, further comprising said hypervisor or host operating system permitting pages of said address space of said at least one virtual machine to be paged in and paged out and, when a page in said locked state is paged in, permitting said page to be loaded only from a specified storage location that is protected against alteration.

10. The method of claim 5, further comprising verifying outside the at least one virtual machine the integrity of program code when such code is loaded into said at least one virtual machine.

11. A non-transitory storage medium containing computer program code operative, when run on an appropriate computer having a hypervisor in a host operating system and defining at least one virtual machine, wherein an address space of said at least one virtual machine resides on physical memory of said computer under control of said hypervisor and a guest operating system of said at least one virtual machine, to cause at least one of said host operating system and said hypervisor to set parts of an address space of said computer corresponding to parts of the address space of said at least one virtual machine to a locked state in which said parts can be read but not written to;

code operative to signal from said guest operating system to said hypervisor after other components of said guest operating system or of a program running under said guest operating system are loaded into working memory of said at least one virtual machine and before said other components start running; and code operative to cause said hypervisor in response to said signaling to set to said locked state parts of the address space of said computer containing program code of said other components.

12. The non-transitory storage medium of claim 11, further comprising code operative to cause to be set to said locked state parts of the address space of said computer corresponding to part of the address space of said at least one virtual machine comprising space occupied by said guest operating system or by an application running under said guest operating system.

13. The non-transitory storage medium of claim 11, wherein said hypervisor or host operating system permits pages of said address space of said at least one virtual machine to be paged in and paged out, and further comprising code operative, when a page in said locked state is paged in, to permit said page to be loaded only from a specified storage location that is protected against alteration.

14. The non-transitory storage medium of claim 11, further comprise code operative to run outside said at least one virtual machine to verify integrity of program code when such code is loaded into said at least one virtual machine.

\* \* \* \* \*